United States Patent [19]

Svetlik et al.

[11] Patent Number: 5,174,349
[45] Date of Patent: Dec. 29, 1992

[54] POWER TABLE SAW ASSEMBLIES HAVING INTEGRAL SPARE PART STORAGE

[75] Inventors: Kenneth N. Svetlik, Schaumburg; William H. Schultz, Northbrook; Daniel B. Feldman, Highland Park, all of Ill.

[73] Assignee: Skil Corporation, Chicago, Ill.

[21] Appl. No.: 743,085

[22] Filed: Aug. 9, 1991

[51] Int. Cl.⁵ ............................................. B25H 1/00
[52] U.S. Cl. .................... 144/286 A; 83/477.2; 144/286 R; 269/16
[58] Field of Search ............ 144/285, 286 R, 286 A, 144/1 R; 83/477.1, 477.2, 574; 269/16

[56] References Cited

U.S. PATENT DOCUMENTS

| | | | |
|---|---|---|---|
| 2,759,507 | 8/1956 | Davis et al. | 144/285 |
| 4,239,195 | 12/1980 | Oltman et al. | 269/16 |
| 4,378,828 | 4/1983 | Shiminski | 144/285 |
| 4,599,927 | 7/1986 | Eccardt et al. | 83/477.2 |
| 5,082,038 | 1/1992 | Teel | 144/286 R |
| 5,113,920 | 5/1992 | Sedeniussen | 144/286 R |

Primary Examiner—W. Donald Bray
Attorney, Agent, or Firm—Jones, Day, Reavis & Pogue

[57] ABSTRACT

A power table saw assembly is disclosed which includes arrangements for the storage of spare parts at convenient locations about the surface thereof and in position for ready access to the spare parts without negatively impacting the aesthetics of the product. Specifically, arrangements are provided for the storage of rip fences, miter guides and blade wrenches.

7 Claims, 4 Drawing Sheets

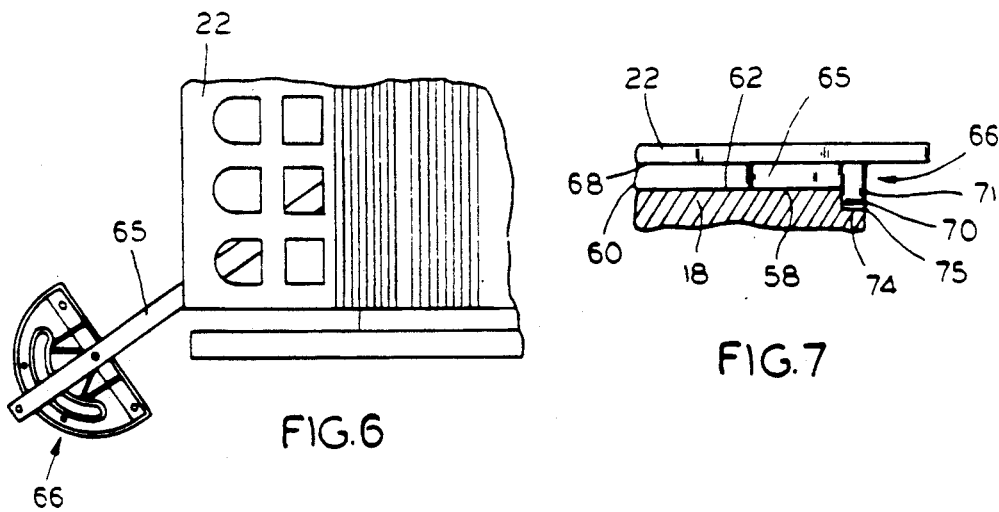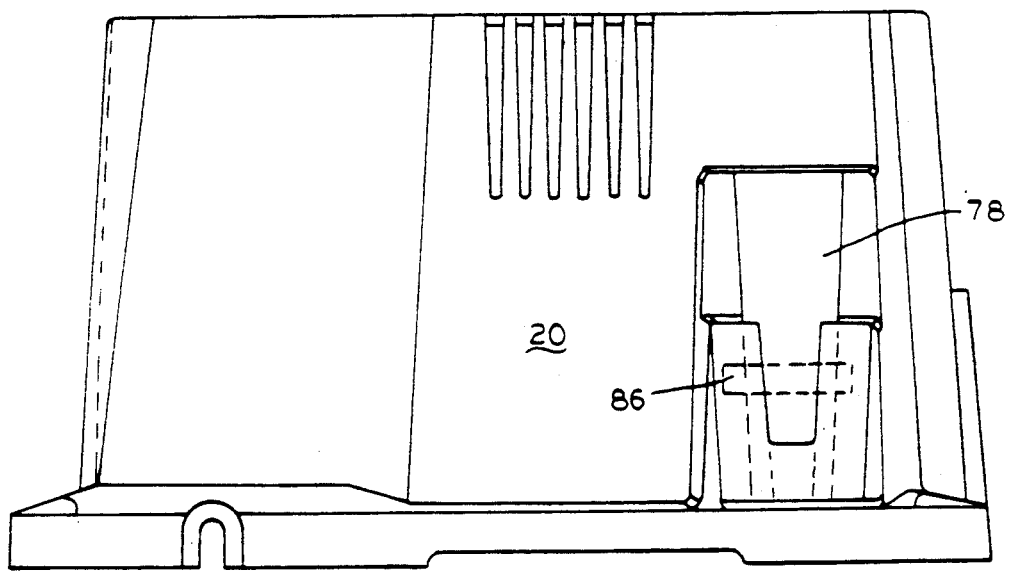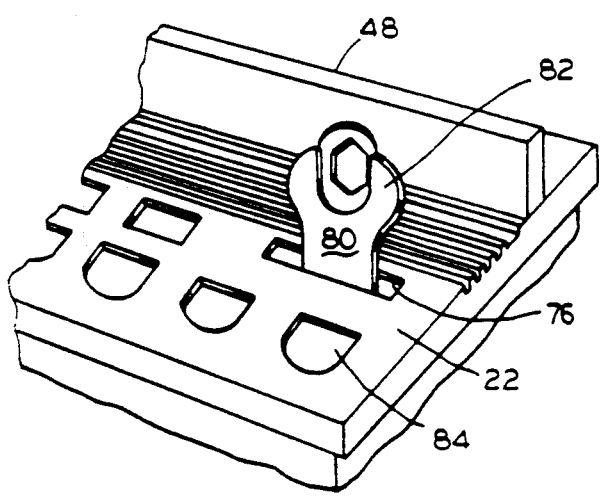

POWER TABLE SAW ASSEMBLIES HAVING INTEGRAL SPARE PART STORAGE

BACKGROUND OF THE INVENTION

This invention relates generally to power table saws and, more particularly, to power table saw assemblies constructed to enable storage of spare parts at convenient locations about the surface of the assemblies for ready access thereto.

A wide variety of power table saw assemblies have been disclosed heretofore. Examples thereof may be found i U.S. Pat. Nos. 4,318,432; 4,516,612; 4,549,455; 4,803,772 and 4,899,795.

However, none of the prior constructions or systems have adequately satisfied the user's requirements for an assembly which will provide suitable storage capacity for needed spare parts in an aesthetically pleasing form while enabling ready access to these stored parts. In general, storage of spare parts for saw assemblies has been provided at a location remote from the device which has required time consuming and costly retrieval procedures.

Thus, it has been a continuing problem to provide an assembly which will enable effective and efficient access to the required spare parts stored integrally about the surface of the power table saw in an aesthetically pleasing manner without interfering with the operation of the device. None of the devices disclosed heretofore have provided a totally satisfactory solution to this spare part storage problem and, particularly, as it relates to the storage of such relatively cumbersome but important spare parts as miter guides, rip fences and blade wrenches.

SUMMARY OF THE INVENTION

In response to the above-noted shortcomings of the prior art, the present invention has been developed. The invention consists of a table saw assembly having a storage system arranged in an aesthetically pleasing manner about its surface for accommodating spare parts in engagement with the assembly in a manner such that the spare parts will not become disengaged from the device while being stored. Furthermore, the spare parts are stored in convenient locations integral with the assembly in order to provide easy access to these spare parts for purposes of enabling access to the parts as needed. In view of the provision of this storage system, tool change time is minimized and the effective operation of the device is maximized.

The inventive table saw assemblies include a pedestal arrangement for storage of a rip fence when it is not in use on the work surface of the saw as well as a nesting arrangement for storing a miter guide in a horizontal position and, in addition, a vertically positioned blade wrench socket for storing a blade wrench for use with the device. Each of the storage areas is positioned about the surface of the table saw device in a manner such that the stored part does not interfere with the operation of the device, but each of the spare parts stored is readily accessible and in immediate proximity to its area of use.

It is therefore a general object of the present invention to provide an improved table saw device having an integral spare part storage system.

A specific object of this invention is to provide a table saw assembly having a storage system for nestingly and securely accommodating spare parts for use in the saw assembly positioned about the surface of the assembly.

A more specific object is to provide such storage system for accommodating a miter guide and a rip fence for use in operation of the saw and a blade wrench for use in operation and maintenance of the saws.

Other objects of the invention, in addition to those set forth above, will become apparent to one of ordinary skill in the art from the following description.

BRIEF DESCRIPTION OF THE DRAWINGS

FIG. 2A is an enlarged fragmentary side view of a pedestal arrangement for accommodating a rip fence;

FIG. 6 is an enlarged fragmentary top plan view showing the miter guide stored within the storage arrangement;

FIG. 7 is a partial sectional view of the miter guide stored within the arrangement of FIG. 6;

FIG. 8 is an enlarged top view showing a blade wrench stored in the housing of the table saw of FIG. 1 seated in a slot in the upper work surface of the saw; and FIG. 9 is a side elevational view showing an inset formed in the housing of the table saw of FIG. 1 and in communication with the slot illustrated in FIG. 8 to accommodate a handle of the stored blade wrench.

DETAILED DESCRIPTION OF THE INVENTION

Figure 1:
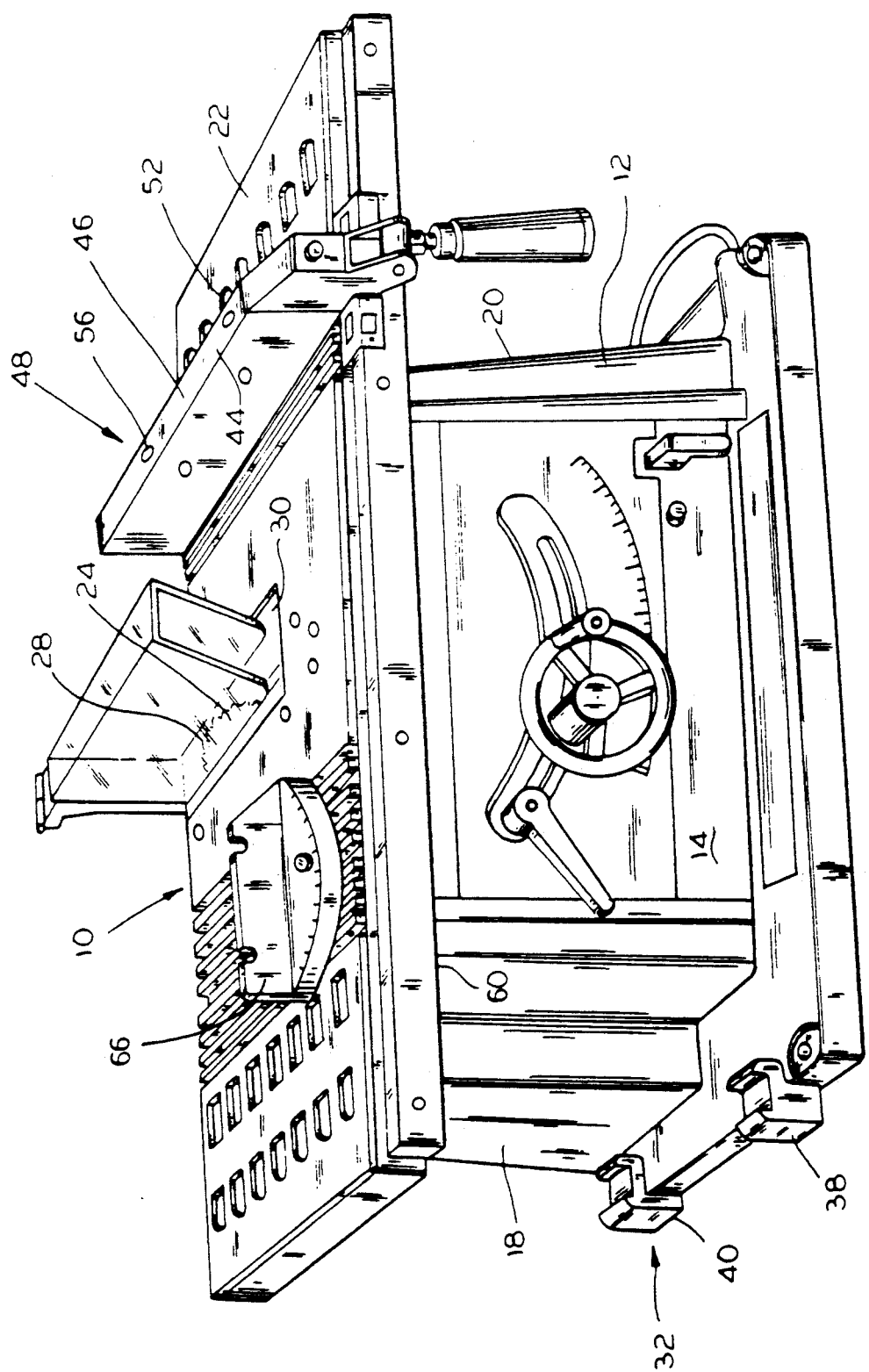
FIG. 1 shows a perspective view of a table saw of the present invention.

FIG. 1 generally illustrates a power table saw 10 including a housing 12 having spaced front and rear walls 14 and 16, respectively, sealingly interconnected by spaced side walls 18 and 20. The housing 12 sealingly engages and supports a slotted, substantially planar work surface 22 on the upper extremity of said walls. A circular saw blade or cutting member 24 is mounted for rotation on a rotatable shaft 26 within the housing beneath the planar work surface via conventional bearing means (not shown) driven by a standard drive motor (not shown).

The blade 24 is positioned transverse to the front and rear walls 14 and 16 of the housing 12. The upper periphery 28 of the saw blade 24 projects outwardly from the interior of the housing 12 through a slot 30 in the slotted work surface 22 to engage a workpiece which may be positioned on the work surface. The table saw 10 further incorporates the usual mechanisms (not shown) enabling the saw blade 24 and its supporting shaft (not shown) to be raised and lowered vertically and to be tilted angularly relative to the work surface 22 for controlled cutting of the material to be sawed.

Positioned about the surface of the housing 12 are a plurality of storage arrangements (designated generally as 32, 34 and 36) to accommodate spare parts for use in conjunction with the operation of the power table saw 10. The spare parts are thus stored in a manner which renders them readily accessible but at locations about the surface of the housing 12 in which they do not interfere with the operation of said saw blade 24.

The storage arrangement 32 includes a pair of pedestals 38 and 40, respectively, which extend outwardly from a lower extremity 42 of side wall 18. The pedestals 38 and 40 are aligned in relationship to one another so that spaced sections 44 and 46 of a rip fence assembly 48 can be engagingly accommodated by each of the pedestals 38 and 40. The rip fence 48 will then extend in a generally horizontal plane between the pedestals 38 and 40 when it is stored therein.

Figure 2:
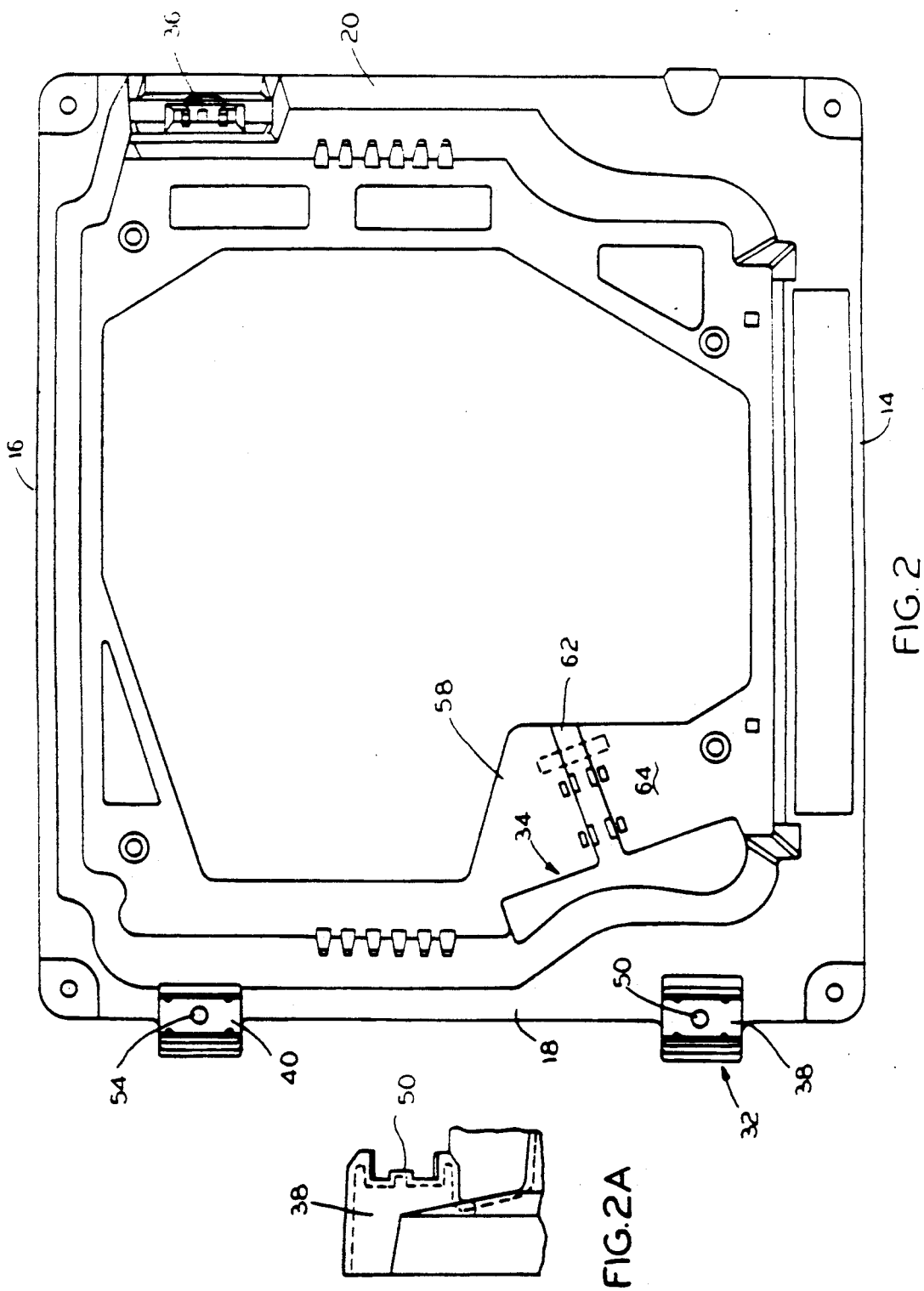
FIG. 2 is a top plan view of a housing of the table saw of FIG. 1 showing the storage system employed for accommodating a rip fence, a miter guide and a blade wrench.

As illustrated in FIG. 2, the pedestals 38 and 40 have tab members or nodes 50 and 54 projecting upwardly therefrom in a manner such that the tabs 50 and 54 will engage and interlock mating or locking holes 52 and 56 formed in sections 44 and 46, respectively, of rip fence 48. FIG. 2A best illustrates the configuration of the pedestals as exemplified by the pedestal 38 having tab 50 projecting upwardly therefrom.

Figure 3:
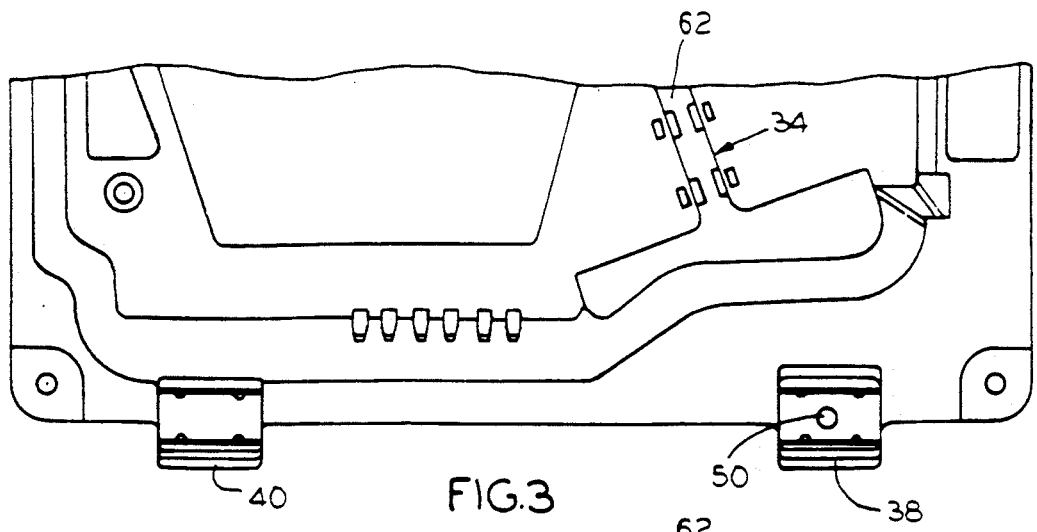
FIGS. 3 and 4 are fragmentary top plan views showing alternative embodiments of the pedestal arrangement for accommodating the rip fence.
Figure 4:
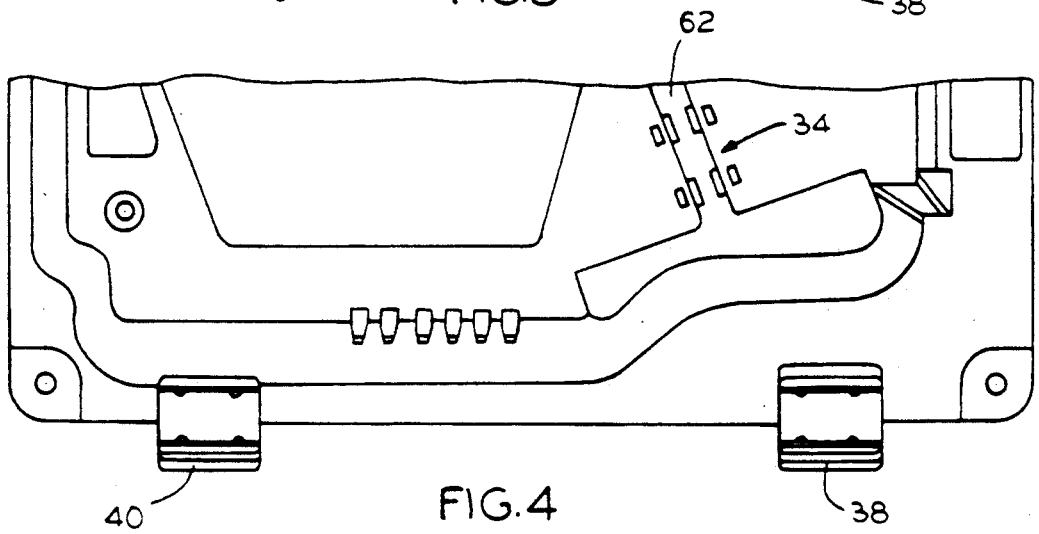

In a further embodiment of this invention, illustrated in FIG. 3, the pedestal 38 is provided with a locking tab 50 for engagement with hole 52 in rip fence assembly 48 to lock the rip fence in stored position and pedestal 40 does not include a tab. FIG. 4 illustrates a further alternative embodiment wherein neither of the pedestals 38 and 40 have tabs but the pedestals are configured to engagingly and nestingly accommodate the rip fence 48 when positioned therein and therebetween.

Storage arrangement 34 includes a horizontally extending flange section 58 projecting inwardly from the upper extremity 60 of wall 18. The flange section 58 has a channel 62 formed in an upper face 64 thereof to accommodate a portion 65 of a miter guide 66 in nesting relationship between the flange section 58 of housing 12 and the underside 68 of working surface 22. In addition, as best illustrated in FIG. 7, a recess or niche 70 is formed in flange section 58 which extends vertically downward from the channel 6 to accommodate another portion 71 of the miter guide 66. The slot 70 terminates at its lower extremity 72 in a ledge 74 on which a further portion 75 of the miter guide 66 rests when the miter guide is stored in the channel 62 and the recess 70.

Figure 5:
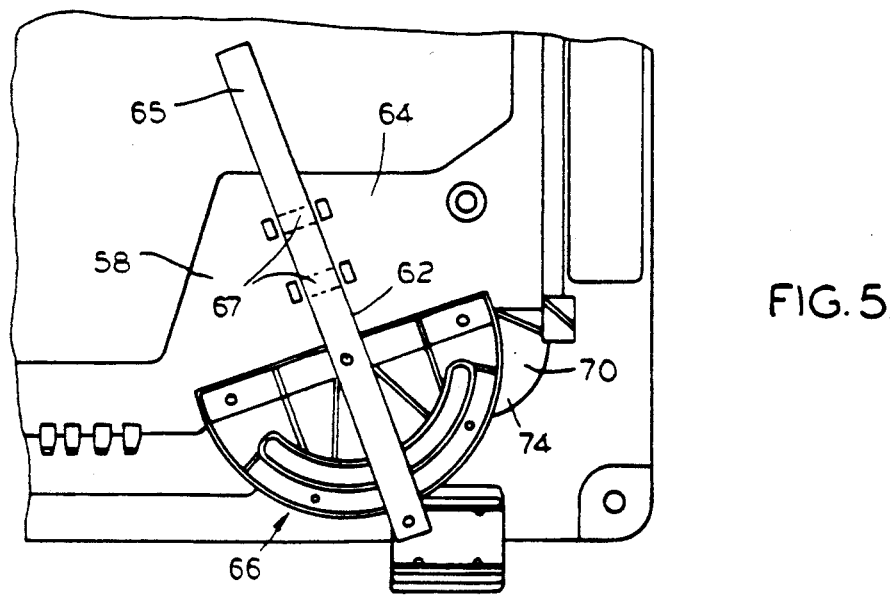
FIG. 5 is an enlarged fragmentary top plan view showing a miter guide being inserted into a storage arrangement positioned beneath the work surface of the table saw of FIG. 1.

Thus, in order to store the miter guide 66, it is slid under the upper work surface 22 as illustrated in FIG. 5 with the rule edge portion 65 advancing into the channel 62 in housing 12. In this manner the miter guide 66 is sandwiched between the underside 68 of the work surface 22 and the upper extremity 60 of wall 18 in order to nestingly store the miter guide. If additional retention is desired to maintain the stored miter guide 66 in position, retention members or straps 67 may be provided lateral to the channel 62 as illustrated in phantom in FIG. 6.

Storage arrangement 36 includes a slot 76 illustrated in FIG. 8 formed in the planar working surface 22 which is in communication with a downwardly extending vertical inset 78 in side wall 20 of the housing 12 so that a blade wrench 80 can be inserted through the slot 76 in the working surface 22 with its head 82 projecting outwardly therefrom and the handle 84 of the wrench 80 is accommodated within the vertical inset 78.

As best illustrated in FIG. 9, a retention element 86 (shown in phantom) in the nature of a strap or other like member may be positioned lateral to the vertical inset 78 in order to provide a positive lock or holding mechanism for the wrench handle 84 extending through slot 76 and into position within the vertical inset 78, which acts as a "holster" for accommodating the handle 84.

Accordingly, the present invention provides an improved storage system for retaining valuable spare parts in ready position for retrieval without damaging the aesthetics or functionality of the product. As a result of the construction of the present devices and, particularly, the relative placement of the storage arrangements about the surface of the power table saw assembly as well as the configuration and structure of the various storage arrangements, a more efficient and effective device is provided relative to prior power table saw assemblies.

Although the invention has been described in its preferred form with a certain degree of particularity, it is to be understood that the present disclosure has been made by way of example only. Numerous changes in the details and construction of the combination and arrangement of parts will be apparent without departing from the spirit and scope of the invention, as defined in the appended claims.

We claim:

1. A power table saw assembly comprising:
   a housing having spaced front and rear walls sealingly interconnected by spaced side walls, said housing sealingly engaging and supporting a slotted, substantially planar work surface on the upper extremity of said walls;
   a rotatable, circular saw blade mounted within said housing beneath said planar work surface, said circular saw blade being positioned transverse to said front and rear walls with the upper periphery of said blade projecting outwardly from said housing through a slot in said slotted work surface to engage a workpiece positioned on said work surface;
   means for storing spare parts for use in conjunction with the operation of said power table saw at positions located about the surface of said housing in a manner such that said spare parts are readily accessible but do not interfere with the operation of said saw blade; and
   said means for storing spare parts including a pair of pedestals each extending outwardly from a lower extremity of one of said spaced side walls and aligned in relationship to one another so that spaced sections of a rip fence assembly can be engagingly accommodated by each of said pedestals and said rip fence will extend in a generally horizontal plane between said pedestals.

2. The power table saw assembly of claim 1 wherein at least one of said pedestals has tab member projecting upwardly therefrom in a manner such that the tab will engage and interlock with a mating hole formed in the section of the rip fence adapted to be engagingly accommodated by said pedestal.

3. A power table saw assembly comprising:
   a housing having spaced front and rear walls sealingly interconnected by spaced side walls, said housing sealingly engaging and supporting a slotted, substantially planar work surface on the upper extremity of said walls;
   a rotatable, circular saw blade mounted within said housing beneath said planar work surface, said circular saw blade being positioned transverse to said front and rear walls with the upper periphery of said blade projecting outwardly from said housing through a slot in said slotted work surface to engage a workpiece positioned on said work surface;

means for storing spare parts for use in conjunction with the operation of said power table saw at positions located about the surface of said housing in a manner such that said spare parts are readily accessible but do not interfere with the operation of said saw blade; and said housing including a horizontally extending flange section projecting inwardly from said upper extremity of one of said walls, said flange section having a channel formed in an upper face thereof to accommodate a portion of a miter guide in nesting relationship between said flange section and the underside of said work surface in order to provide said storage means for said miter guide.

4. The power table saw of claim 3 wherein a recess in said flange section extends vertically downward from said channel to accommodate another portion of said miter guide, said recess terminating at its lower extremity in a ledge on which a further portion of said miter guide rests when said miter guide is stored in said channel and said recess.

5. A power table saw assembly comprising:

a housing having spaced front and rear walls sealingly interconnected by spaced side walls, said housing sealingly engaging and supporting a slotted, substantially planar work surface on the upper extremity of said walls;

a rotatable, circular saw blade mounted within said housing beneath said planar work surface, said circular saw blade being positioned transverse to said front and rear walls with the upper periphery of said blade projecting outwardly from said housing through a slot in said slotted work surface to engage a workpiece positioned on said work surface;

means for storing spare parts for use in conjunction with the operation of said power table saw at positions located about the surface of said housing in a manner such that said spare parts are readily accessible but do not interfere with the operation of said saw blade; and said means for storing spare parts including a slot formed in the surface of said planar work surface in communication with a downwardly extending vertical slot in a side wall of said housing so that a blade wrench can be inserted through the slot in the work surface with its head projecting outwardly therefrom and the handle of the wrench is accommodated within the vertical slot.

6. The power table saw of claim 5 wherein a retention means is positioned lateral to said vertical slot for holding said wrench handle in position within the vertical slot.

7. The power table saw of claim 6 wherein said retention means is a strap.

* * * * *